United States Patent
Bedouet

(10) Patent No.: US 6,472,774 B1
(45) Date of Patent: Oct. 29, 2002

(54) DEVICE FOR DISTRIBUTING ENERGY BETWEEN A PLURALITY OF ELECTRONIC MODULES WITH POSSIBILITY OF SHEDDING

(75) Inventor: Bernard Bedouet, Bourg les Valence (FR)

(73) Assignee: Thomson-CSF Sextant, Velizy Villacoublay (FR)

( * ) Notice: Subject to any disclaimer, the term of this patent is extended or adjusted under 35 U.S.C. 154(b) by 0 days.

(21) Appl. No.: 09/720,243

(22) PCT Filed: Apr. 28, 2000

(86) PCT No.: PCT/FR00/01163
§ 371 (c)(1),
(2), (4) Date: Jan. 4, 2001

(87) PCT Pub. No.: WO00/67357
PCT Pub. Date: Nov. 9, 2000

(30) Foreign Application Priority Data

May 4, 1999 (FR) .............................................. 99 05654

(51) Int. Cl.$^7$ ................................................. H02J 1/14
(52) U.S. Cl. .......................................... 307/31; 307/39
(58) Field of Search ............................... 307/29, 31–35, 307/38–41; 361/191

(56) References Cited

U.S. PATENT DOCUMENTS 4,177,388 A * 12/1979 Lingenfelter ................. 307/39
5,386,363 A * 1/1995 Haak et al. .................. 700/292
5,543,666 A * 8/1996 Priesemuth ................... 307/31
5,687,052 A * 11/1997 Bennett ....................... 361/191
6,097,584 A    8/2000 Bedouet

* cited by examiner

Primary Examiner—Fritz Fleming
(74) Attorney, Agent, or Firm—Oblon, Spivak, McClelland, Maier & Neustadt, P.C.

(57) ABSTRACT

This device allows secure electrical supply of several electronic modules able to be brought together in the same electronic rack and having several levels of criticality. It includes an electrical supply line (13) attached on the one hand to at least one electrical energy distribution network (20) and on the other hand to the various electronic modules (M1, M2, ... Mn) by way of breaker relays (I1, I2, ..., In) and means for managing the load sheddings instigating the commands for opening and closing the breaker relays (I1, I2, ..., In) as a function of the load shedding control signals received. The means for managing the load sheddings are composed of a network partitioning load shedding commands (21) attached to the controls of the breaker relays (I1, I2, ..., In) by way of diode-type switches (S1, S2, ..., Sn) and of a system of straps (22, 220) guaranteeing them great ability of adaptation to the changes of configuration of the equipment of the rack.

16 Claims, 3 Drawing Sheets

Figure 1:
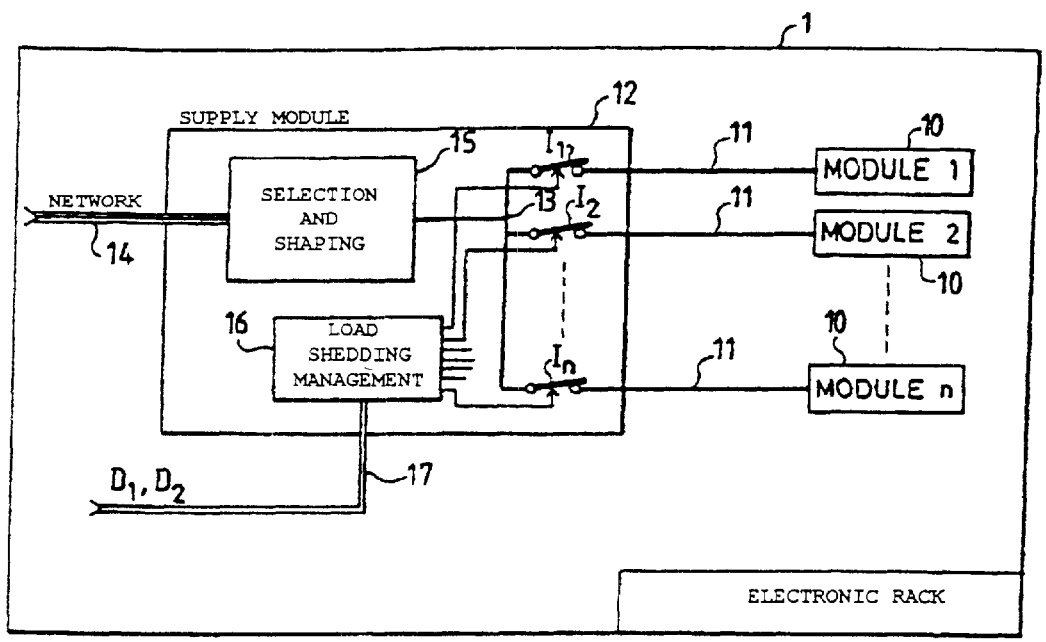

DEVICE FOR DISTRIBUTING ENERGY BETWEEN A PLURALITY OF ELECTRONIC MODULES WITH POSSIBILITY OF SHEDDING

The present invention relates to the secure electrical supply of several electronic modules able to be brought together in the same rack and having several levels of criticality.

It applies in particular, but not exclusively, to the electrical supply of electronic equipment on board aircraft.

The electronic equipment mounted on board an aircraft is usually grouped together in racks and supplied, by way of one or more electrical energy distribution networks, by means of alternators driven by the engines propelling the aircraft and backed up by electrochemical accumulator batteries. The electrical power available on the electrical energy distribution networks of an aircraft depends on the generator used and requires management of the electrical power consumed as a function of the availabilities at the time. Certain events, such as a loss of engine power, startup of the propulsion engine(s) from the electrochemical accumulator batteries or else a partial failure at the level of the distribution networks, bring about a reduction in the electrical power available such that it is no longer possible to satisfy the energy requirements of all the attached electronic equipment. It is therefore necessary to make choices and to carry out load shedding of the electrical energy distribution networks, by cutting the supply to the electronic modules considered to be the least critical for the continuance of the mission. In view of this eventuality, the electronic equipment of an aircraft are classified according to several levels of criticality, usually three: critical, essential and normal, and connected to the electrical energy distribution networks by way of switches controlled by a load shedding management device to which are sent more or less severe load shedding commands depending on the instantaneous electrical power available.

The device for partitioning electrical energy of an electronic rack for an aircraft therefore usually encloses electrical partitioning wiring linking the electronic modules of the rack to one or more electrical energy distribution networks with outputs equipped with switches under the control of a device for managing load sheddings.

The aeronautical environment imposes particular constraints on an electrical energy partitioning device for an airborne electronic rack, in particular, reliability constraints which are especially severe as regards the system for managing load sheddings which, should there be a failure, must not give rise to untimely cuts in the supply to the equipment, weight constraints and modularity constraints. Specifically, an electrical energy partitioning device for an airborne electronic rack must be capable of being tailored at least expense, to the great diversity of levels of equipment which may be encountered on an aircraft, and to the changes due to the upgrading of this equipment as a result of the incessant advances in technology. To cope with this great diversity of levels of equipment and to ease the upgrading of the equipment, the trend is to use electronic modules with standardized dimensions and standardized connector engineering, specialized by functions, some of which form part of the original equipment of the aircraft and others of which are added subsequently, and to accommodate them, in rows in racks equipped with standardized backplane connectors.

The lightness constraints prompt the adoption, for the construction of the load shedding management system, of a single integrated circuit simultaneously delivering the control commands for all the switches controlling the individual branch-offs of the supplies to the electronic modules, this integrated circuit being, for example, a semi-custom or precharacterized ASIC (Application Specific Integrated Circuit) digital integrated circuit, the architecture of which is determined from a combination of precharacterized elementary cells. Such a circuit has the drawback of necessarily being complex since it must be designed for the maximum capacity of the rack in terms of electronic modules and to allow a maximum possibility of choice of criticality level for each electronic module of the rack. Due to its complexity, it encloses a large number of semiconductor elements, this raising reliability problems since the reliability of an electronic circuit is inversely proportional to the number of semiconductor elements that it contains.

The object of the present invention is a device for partitioning electrical energy between a plurality of electronic modules with possibility of load shedding guaranteeing a very considerable level of security despite the presence of a load shedding system.

Its object is also a device for partitioning electrical energy between a plurality of electronic modules, with possibility of load shedding, tolerating a change in the supplied electronic modules, in their number and in their criticality class whilst complying with a very high level of security.

Its subject is a device for partitioning electrical energy between a plurality of electronic modules disposed in an electronic rack, with possibility of several levels of load shedding, comprising an electrical supply line attached on the one hand to at least one electrical energy distribution network and on the other hand to the various electronic modules by way of breaker relays and means for managing the load sheddings instigating the commands for opening and closing the breaker relays as a function of load shedding control signals applied to the electrical energy partitioning device and corresponding to the desired level of load shedding. This electrical energy partitioning device is noteworthy in that the means for managing the load sheddings comprise:

a network partitioning load shedding commands with several parallel electrical conductors, equal in number to that of the desired levels of load shedding, each attached to a load shedding control input corresponding to a particular level of load shedding, diode-type switches carrying out an "or"-type logic function, equal in number to that of the breaker relays, each having an output attached to the control input of a breaker relay and inputs equal in number to that of the levels of load shedding, and a tag strip interposed between the inputs of the diode-type switches and the parallel conductors of the network partitioning load shedding commands, making it possible to establish, with the aid of straps, connections between the inputs of each diode-type switch and the electrical conductors of the network partitioning load shedding commands as a function of the criticality levels allocated to the electronic module or modules supplied by way of the breaker relay whose control input is driven by the relevant diode-type switch.

Advantageously, the electrical energy partitioning device further includes electronic amplifying circuits which are interposed at input ahead of each of the conductors of the network partitioning load shedding commands and which operate in the disabled or saturated state in such a way as to pass or not pass a current through the diodes of the switches connected to their outputs by way of the conductors of the network partitioning load shedding commands and wired straps of the tag strip, and thus to control the open or closed states of the breaker relays disposed on the supply lines of the electronic modules.

Advantageously, the electronic amplifying circuits interposed at input ahead of the conductors of the network for partitioning load shedding commands are quipped with a contact relay interposed on their utput making it possible to subject the execution of a load shedding command to an additional condition such as the noting of a low electric voltage on the electrical energy distribution network or networks at the input of the rack.

Advantageously, the electronic amplifying circuits interposed at input, ahead of the conductors of the network for partitioning load shedding commands are equipped with a contact relay connecting their output to earth or to the potential of a bias source in such a way as to force the generation of a load shedding command in the presence of an additional condition such as the noting of an overly large electric current consumed by the rack.

Advantageously, the electronic amplifying circuits interposed at input ahead of each of the conductors of the network for partitioning load shedding commands include at least one transistor-based amplifier stage.

Advantageously, the electronic amplifying circuits interposed at input, ahead of each of the conductors of the network for partitioning load shedding commands include two transistor-based amplifier stages.

Advantageously, the electronic amplifying circuits interposed at input, ahead of each of the conductors of the network for partitioning load shedding commands include at least one transistor-based amplifier stage mounted in common emitter mode.

Advantageously, the electronic amplifying circuits interposed at input, ahead of each of the conductors of the network for partitioning load shedding commands have their inputs referred back when quiescent by a resistive circuit to a bias voltage urging them to a disabled or saturated state corresponding to an absence of load shedding command.

Advantageously, the electronic amplifying circuits interposed at input, ahead of each of the conductors of the network for partitioning load shedding commands include at input a contact relay open when quiescent, ordered to close by a load shedding command imposing a bias voltage on their inputs causing them to leave their quiescent state.

Advantageously, the device for partitioning electrical energy between a plurality of electronic modules disposed in an electronic rack is made in the form of a so-called "Tsupply" module which plugs into the electronic rack in the same way as the other electronic modules and which exhibits on its front edge, accessible from outside the rack, a plug-in submodule to which some or all of the straps of the tag strip are dropped.

Advantageously, in the case where the electronic modules to be supplied are provided with identifying means specifying their level of criticality, the electrical energy partitioning device is provided with an automaton analyzing the consistency between the load shedding levels assigned to the electronic modules such as they result from the configuration adopted for the wired straps of the tag strip and the levels of criticality of the electronic modules such as they ensue from the information provided by their identifying means.

Advantageously, the consistency analysis automaton controls a consistency indicator light.

Advantageously, in the case where the partitioning device is made in the form of a supply module which can be plugged into a rack, the consistency indicator light is placed on the front edge of the supply module, visible from outside the rack.

Advantageously, in the case where the partitioning device is made in the form of a supply module which can be plugged into a rack, with a plug-in submodule in its front face supporting some or all of the straps of the tag strip, the consistency indicator light is mounted on the front edge of the plug-in submodule.

Figure 3:
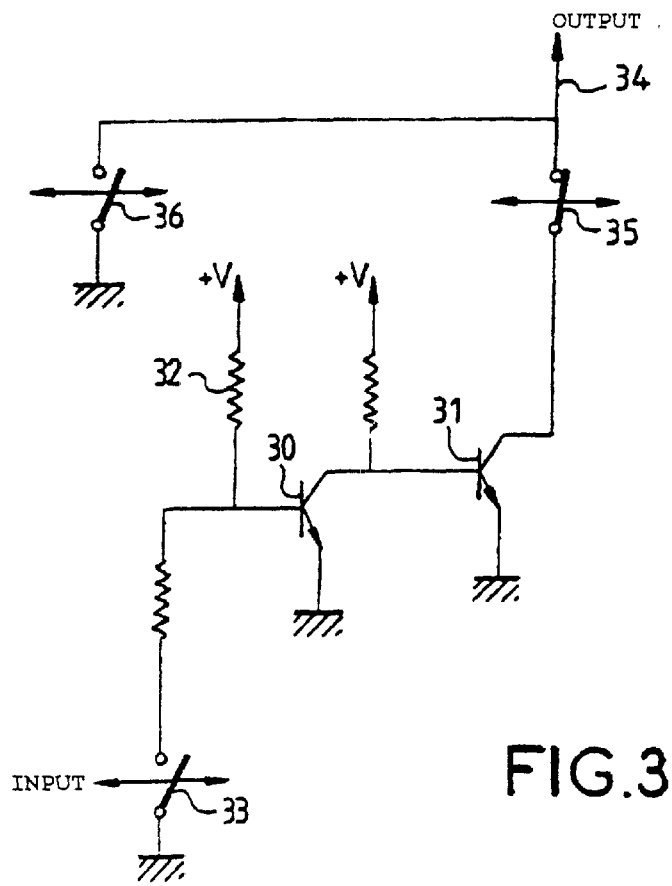
Figure 2:
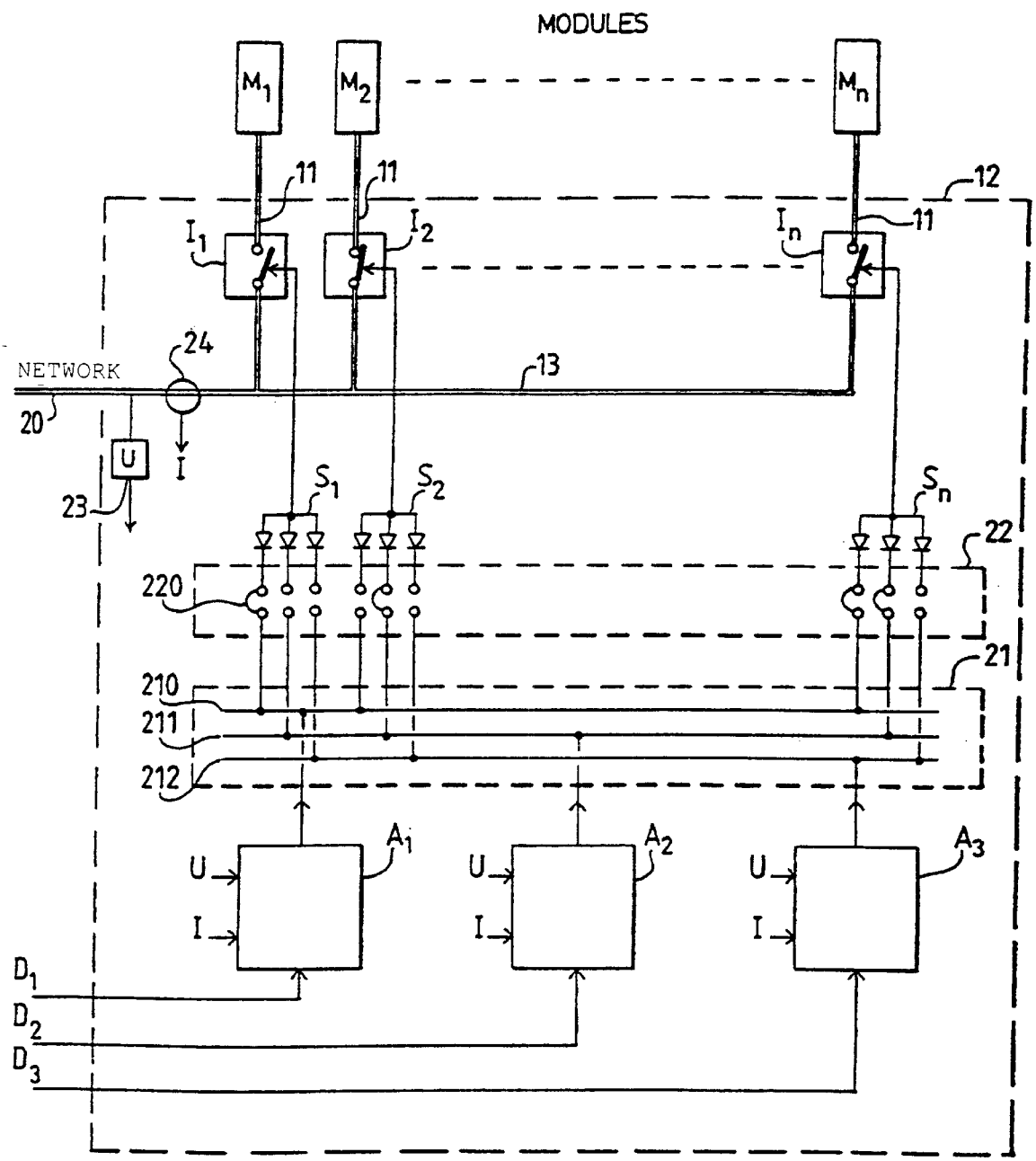
Figure 4:
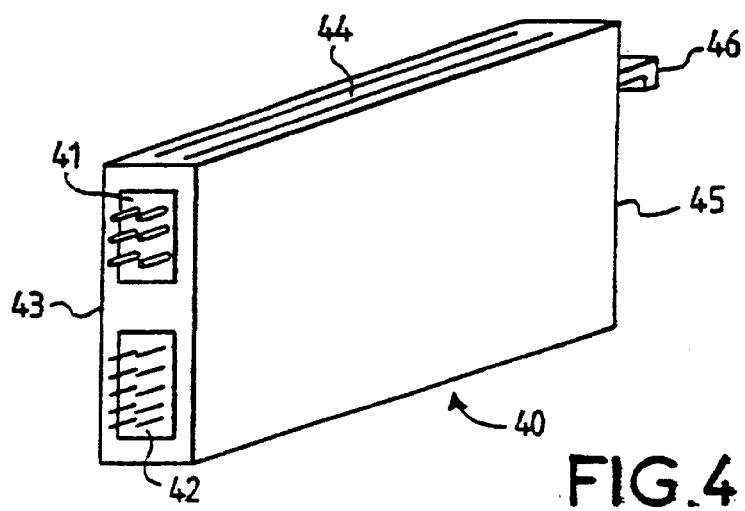
Figure 5:
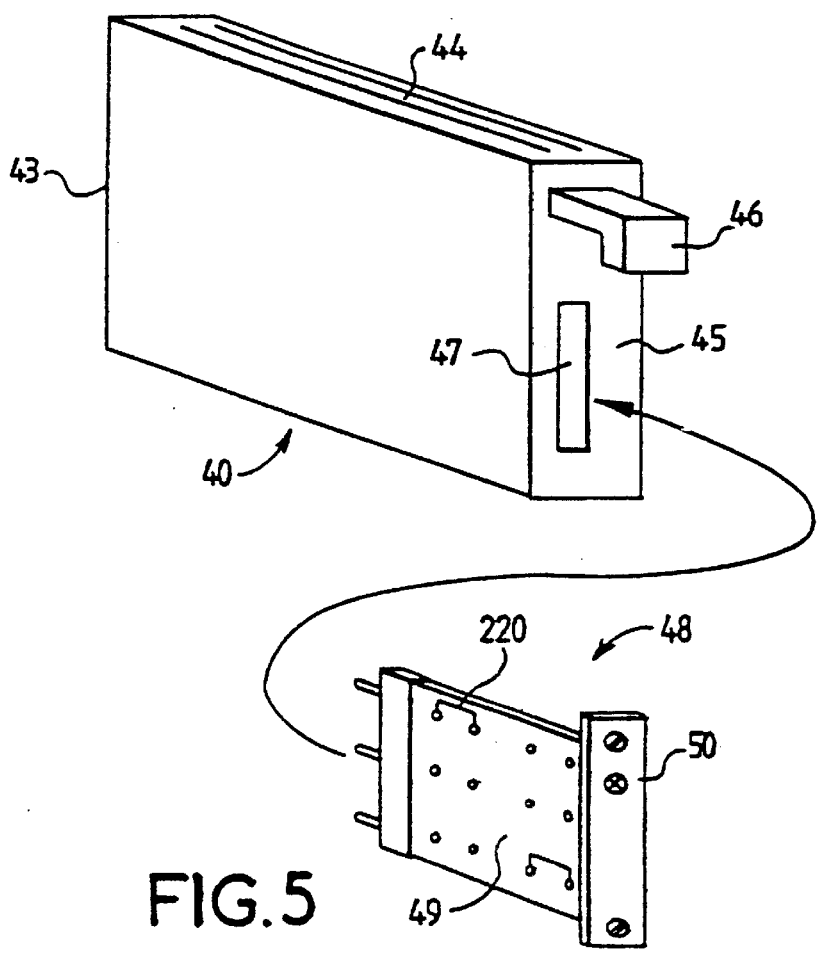

Other characteristics and advantages of the invention will emerge from the following description of embodiment given by way of example. This description will be given in conjunction with the drawing in which:

FIG. 1 is a block diagram illustrating, via its principal functions, a device for partitioning electrical energy between several electronic modules, with the possibility of load shedding, interposed between an electrical energy distribution network and electronic modules to be supplied, FIG. 2 is an electrical diagram illustrating the make-up of an exemplary device for partitioning electrical energy between several electronic modules, with possibility of load shedding, in accordance with the invention, FIG. 3 is an electrical diagram detailing the structure of a type of amplifier used in the electrical energy partitioning device illustrated in FIG. 2, FIG. 4 shows an embodiment, in the form Of a plug-in supply module, of an electrical energy partitioning device according to the invention, seen in perspective, from its rear edge equipped with half-connectors intended to plug into half-connectors of complementary form with which the backplane of a rack of electronic equipment is equipped, and FIG. 5 is a view, in perspective, from its front edge, of the supply module illustrated in FIG. 4.

FIG. 1 illustrates an electrical arrangement enabling an electronic rack to be supplied with electrical energy and permitting load sheddings. The electronic rack 1 encloses a plurality of electronic modules 10 with individual supply wires 11, and an electrical energy partitioning device 12 interposed between the individual supply wires 11 of the electronic modules 10 and one or more electrical energy distribution networks 14.

The electrical energy partitioning device 12 encloses chiefly:

- star-like electrical wiring 13 with a connection node joining feed-out branches connected individually to the supply wires 11 of the electronic modules 10 and a feed-in branch, with a possibly subdivided input, connected to one or more electrical energy distribution networks 14,
- breaker relays I1, I2, . . . , In, interposed on each feed-out of the star-like electrical wiring 13 heading to the individual supply wires 11 of the electronic modules 10,
- a system 15 for selecting an electrical energy distribution network if there are several of them, and for shaping the signal of the selected network (voltage preregulation), interposed on the feed-in branch, between the inputs assigned to the electrical energy distribution networks and the node of the star-like wiring 13, and
- a load shedding management system 16 controlling the breaker relays I1, I2, . . . , In, as a function of commands D1, D2, . . . , which correspond to various possible levels of load shedding and which are applied to a load shedding control input 17 of the electrical energy partitioning device 12.

With the object of simplification, in what follows reference will no longer be made to the system 15 for selecting and shaping network, which may take multiple forms as a function of the actual configuration, single or multiple, of the network for providing energy and its electrical properties, since this system is known to the person skilled in the art and does not form part of the invention. It is sufficient to keep in mind that such a system for selecting and shaping network is very often present in an electrical energy partitioning device with which a rack of electronic equipment is equipped, and that it is then located on the branch of the star-like electrical wiring of the electrical energy partitioning device leading to the input or to the inputs assigned to the single or multiple electrical energy distribution network.

FIG. 2 shows the architecture adopted in order to give a device for partitioning electrical energy inside a rack of electronic equipment both a high degree of safety in the management of load sheddings and great ability of adaptation to the diversity of possible setups of electronic modules of a rack at the time of its initial configuration and to the changes which may be made to this initial configuration over the duration of use of the rack, as regards the number and nature or the levels of load shedding of the electronic modules which it encloses.

The electrical energy partitioning device 12 represented in this FIG. 2 is designed to permit three levels of load shedding. It is interposed between a set of electronic modules M1, M2, . . . Mn and an electrical energy distribution network 20. It encloses, as indicated previously in relation to FIG. 1, star-like electrical wiring 13 with feed-out branches each connected to an individual supply wire 11 of an electronic module M1, M2, . . . , Mn by way of a breaker relay I1, I2, . . . , In, allowing load shedding operations, and with a feed-in branch connected to the electrical energy distribution network 20 with the possible interposition of a system for selecting and shaping network (not represented).

The controls of the breaker relays I1, I2, In are connected to a wired network for partitioning load shedding commands 21 by way of a set of diode-type switches S1, S2, . . . , Sn and of a tag strip 22 making it possible to define, via straps, wired as a function of requirements, the electronic modules powered-down in each of the load shedding levels.

The network for partitioning load shedding commands 21 is formed of three parallel electrical conductors 210, 211, 212 each assigned to the propagation of one of the three possible load shedding commands D1, D2, D3 corresponding to the three load shedding levels provided.

The diode-type switches S1, S2, . . . , Sn carry out an "or"-type logic function. They are equal in number to that of the breaker relays I1, I2, . . . , In, each having a single output attached to the control input of a breaker relay I1, I2, . . . , In and inputs equal in number to that of the load shedding levels, attachable by way of the straps of the tag strip 22 to the parallel electrical conductors 210, 211, 212 of the network for partitioning load shedding commands 21.

The tag strip 22 interposed between the inputs of the diode-type switches S1, S2, . . . , Sn and the parallel conductors 210, 211, 212 of the network for partitioning load shedding commands 21, has sets of straps 220 making it possible to configure, on demand, the connections between the inputs of each diode-type switch and the electrical conductors 210, 211, 212 of the network for partitioning load shedding commands 21. By virtue of these sets of straps 220, it is possible to contrive matters such that the control of each breaker relay I1, I2, . . . , In is attached to the electrical conductors 210, 211, 212 of the network for partitioning load shedding commands 21 corresponding to the load shedding levels allocated to the supplied electronic module M1, M2, . . . , Mn and solely to these conductors.

In the exemplary configuration represented, it is seen that with the straps 220 set in place on the tag strip 22, the electrical conductor 210 of the partitioner of load shedding commands 21, which is assigned to a first load shedding level, is attached to the control inputs of the breaker relays I1 and In whilst the electrical conductor 211 of the partitioner of load shedding commands 21, which is assigned to a second load shedding level, is attached to the control inputs of the relay breakers I2 and In, and that the electrical conductor 212 of the partitioner of load shedding commands 21, which is assigned to a third load shedding level, is not attached. This corresponds to the case where one wishes to have a load shedding level where the supplies to the electronic modules M1 and Mn are cut and another load shedding level where the supplies to the electronic modules M2 and Mn are cut.

It is appreciated, in fact, that when the electrical energy available becomes insufficient to supply all the electronic modules of a rack, it has to be saved by making choices which depend on the relative importances of the functions fulfilled by the electronic modules of the rack at the relevant time. Thus, it is possible to have electronic modules carrying out microcomputer functions, others for managing input/output information, others for the communication bus, others for generating symbols for a display system, yet others for processing options, etc. These various electronic modules do not have the same relative importance, the latter possibly changing as a function of events. Since load shedding necessarily leads to the loss of the functions fulfilled by the electronic modules whose supply is cut, it ought to be brought to bear first on the electronic modules fulfilling the least crucial functions at the given instant. The importance of the functions fulfilled in relation to the situations encountered forms the subject of a prior study which consists in cataloging the various possible situations, grouping them together in various classes referred to as "load shedding classes", corresponding each time to a particular scale of the relative importances or levels of criticality of the functions fulfilled by the electronic modules and in determining, for each load shedding class, criteria for identifying situations and the electronic modules, the cutting of whose supply brings about the least penalizing consequences. A logic system is designed on the basis of this study, which system determines, as a function of the situation identification criteria adopted, the load shedding class to be adopted when the electrical energy available becomes insufficient and which instigates a load shedding command specific to the load shedding class adopted.

In the example described, three load shedding classes are provided, each being called up by a specific load shedding command D1, D2, D3 instigated by a piece of monitoring equipment external to the rack. These load shedding commands are each also found on the electrical conductor 210, 211 or 212 reserved therefor of the network for partitioning load shedding commands 21. They may be found there again as is if the signals which convey them have sufficient power. This is rarely the case. Also, in the embodiment described, it is preferred that they be subjected to prior amplification by means of individual amplifying circuits A1, A2, A3 which also have the benefit of allowing forcing or possible disabling of a load shedding command as a function of a local operating criterion based on measurements of voltage and of supply current at the input of the rack making it possible to take account of a local problem on the energy distribution network 20.

FIG. 3 gives an exemplary diagram adopted for a load shedding command amplifier circuit A1, A2 or A3. Each amplifier circuit includes two successive amplifier stages consisting of an NPN transistor 30, 31 mounted in common emitter mode. The input of the first stage is referred back when quiescent to the bias voltage +V by way of a resistor 32 and earthed by way of a contact of a relay 33 closed by a load shedding command. The general output 34 of the amplifier circuit is linked to the output of the second amplifier stage by way of the contact of a first relay 35 closed when quiescent and to earth by way of the contact of a second relay 36 open when quiescent. The The circuit for managing load sheddings operates as follows. The breaker relays I1, I2, . . . , In are closed in the quiescent state corresponding to an absence of excitation of their control input left at a floating potential and they open when their control input is earthed. The diode-type switches S1, S2, . . . , Sn make it possible to subdivide the control input of each breaker relay I1, I2, . . . , In into as many, mutually independent, control subinputs as there are load shedding levels, here three. The straps 220 of the tag strip 22 make it possible, depending on their presence or their absence, to attach each electrical conductor 210, 211, 212 of the partitioner of load shedding commands 21, to the control inputs of all or some of the breaker relays I1, I2, . . . , In by way of the control subinputs procured by the diode-type switches S1, S2, . . . , Sn. Thus, the earthing of an electrical conductor 210, 211, 212 of the partitioner of load shedding commands brings about that of the control inputs of the breaker relays I1, I2, . . . , In which are attached to it and consequently the opening of the relevant breaker relays.

The earthings of the electrical conductors 210, 211, 212 of the partitioner of load shedding commands are brought about individually, in the presence of three types of load shedding command D1, D2, D3, by means of the amplifiers A1, A2, A3.

By dint of its design represented in FIG. 3, an amplifier A1, A2 or A3, when it is quiescent, that is to say when the relays 35 and 36 connected to its output and the relay 33 connected to its input are also quiescent, has its output left at a floating potential on account of the disabled state of its second transistor stage 31. This floating potential is communicated to the electrical conductor 210, 211 or 212 of the partitioner of load shedding commands 21 linked to it and, by the wired straps 220 of the tag strip 22, to some of the subinputs of the diode-type switches S1, S2, . . . , Sn. It has no effect on the control inputs of the breaker relays I1, I2, . . . , In which remain in their present states.

When the relay 33 connected to the input of an amplifier A1, A2 or A3 is excited by a load shedding command D1, D2 or D3 respectively, its contact closes. This results in earthing of the input of the first NPN transistor stage 30 of the amplifier which becomes disabled and gives rise to the disabling of the second NPN transistor stage 31 which saturates and takes its output to a potential close to that of earth. Assuming that the relays 35 and 36 output-connected to the relevant amplifier remain quiescent, the potential close to that of earth of the second NPN transistor stage 31 is transmitted to the output of the amplifier. From there it reaches the electrical conductor 210, 211 or 212 of the partitioner of load shedding commands 21 driven by the relevant amplifier and also, through the intermediary of the wired straps of the tag strip 22 terminating at this electrical conductor, to a certain number of subinputs of the diode-type switches S1, S2, . . . , Sn. These earthings propagate through the diode-type switches S1, S2, . . . , Sn to those control inputs of the breaker relays I1, I2, . . . , In which are attached to the relevant electrical conductor 210, 211 or 212 and bring about the openings of these breaker relays if they are not already open.

The relay 35 interposed at the output of an amplifier A1, A2 or A3 and closed when quiescent can be used to confirm the validity of a load shedding command D1, D2 or D3. It is then controlled by a voltage measuring circuit (23 FIG. 2) disposed at the level of the branch-off of the equipment rack, on the electrical energy distribution network 20. Specifically, a load shedding command is justified only when the electrical energy available becomes insufficient, this generally being manifested by a reduction in voltage on the network providing the rack with electrical energy.

The relay 36 which shunts the output of an amplifier A1, A2 or A3 to earth and is open when quiescent can be used to force a load shedding maneuver when it transpires that there is a problem with electrical energy consumption at the level of the electronic modules of the rack. It is then controlled by a current measuring circuit (24 FIG. 2) placed on the branch-off from the rack to the electrical energy distribution network 20.

The level of reliability of an electronic circuit being inversely proportional to the number of transistors which it encloses, the reliability of the load shedding command amplifiers A1, A2 and A3, which include only two transistors, is very high, of the order of $2\ 10^{-8}$, out of range of the usual ASIC circuits.

Furthermore, by making the amplifiers A1, A2, A3 by means of separate integrated circuits it is possible to minimize the chances of a global breakdown of the load shedding system.

With the aim of modularity, the device for partitioning electrical energy between the various electronic modules of a rack is itself made in the form of a standard plug-in supply module suitable regardless of the manner in which the rack is configured with electronic equipment.

FIG. 4 shows, seen from the rear edge, how such a supply module might look. This module takes the form of a rectangular housing 40 of suitable thickness for accommodating a printed circuit board on which are mounted the components of the electrical energy partitioning device as well as two sets of half-connectors 41, 42 accessible from the rear edge 43 and intended to be plugged into sets of half-connectors of complementary shapes with which the back of the rack is equipped. One 41 of the sets of connectors is reserved for the aircraft's functional wiring while the other 42 is reserved for the configuring straps. Runners 44 are disposed on the lateral edges of the housing 40, so as to allow, as is normal, guidance of the module in rails for inserting the rack during the mounting thereof.

FIG. 5 shows the same supply module 40 seen from its front edge 45. On its front edge 45 this module has a handle 46 allowing manipulation thereof and a slot 47 allowing the insertion of a plug-in submodule 48 with a printed circuit 49 onto which some or all of the configuring straps 220 are dropped. On its front edge, visible from outside the rack, the plug-in submodule 48 has a light 50 which is a configuration consistency indicator controlled by an automaton mounted in the supply module 40 verifying the consistency between the load shedding levels assigned to the electronic modules such as they result from the configuration adopted for the straps 220 of the tag strip 22, and the levels of criticality of the electronic modules such as they ensue from the information provided by identifying means with which each electronic module is equipped.

The identifying means of an electronic module can consist of a wiring array individualizing each electronic module at the level of its rear connectors or of a read only memory which can be interrogated by the automaton for verifying consistency of the supply module.

What is claimed is:

1. Device for partitioning electrical energy between a plurality of electronic modules (M1, M2, . . . , Mn) disposed in an electronic rack (1), with possibility of several levels of load shedding, comprising an electrical supply line (13) attached on the one hand to at least one electrical energy distribution network (20) and on the other hand to the various electronic modules (M1, M2, . . . , Mn) by way of breaker relays (I1, I2, . . . , In) and means for managing the load sheddings (16) instigating the commands for opening and closing the breaker relays (I1, I2, . . . , In) as a function of load shedding control signals (D1, D2, D3) applied to the electrical energy partitioning device and corresponding to the desired level of load shedding, the said electrical energy partitioning device being characterized in that the means for managing the load sheddings (16) comprise:

a network partitioning load shedding commands (21) with several parallel electrical conductors (210, 211, 212), equal in number to that of the desired levels of load shedding, each attached to a load shedding control input corresponding to a particular level of load shedding, diode-type switches (S1, S2, . . . , Sn) carrying out an "or"-type logic function, equal in number to that of the breaker relays (I1, I2, . . . , In), each having an output attached to the control input of a breaker relay (I1, I2 or In) and inputs equal in number to that of the levels of load shedding, and a tag strip (22) interposed between the inputs of the diode-type switches (S1, S2, . . . , Sn) and the parallel conductors (210, 211, 212) of the network partitioning load shedding commands (21), making it possible to establish, with the aid of straps (220), connections between the inputs of each diode-type switch (S1, S2, . . . , Sn) and the electrical conductors (210, 211, 212) of the network partitioning load shedding commands (21) as a function of the load shedding levels allocated to the electronic module or modules (M1, M2, . . . , Mn) supplied by way of the breaker relay (I1, I2, . . . , In) whose control input is driven by the relevant diode-type switch (S1, S2, Sn).

2. Device according to claim 1, characterized in that it further includes electronic amplifying circuits (A1, A2, A3) which are interposed at input ahead of each of the conductors (210, 211, 212) of the network partitioning load shedding commands (21) and which operate in the disabled or saturated state in such a way as to pass or not pass a current through the diodes of the switches (S1, S2, . . . , Sn) connected to their outputs by way of the conductors (210, 211, 212) of the network partitioning load shedding commands (21) and wired straps (220) of the tag strip (22), and thus to control the open or closed states of the breaker relays (I1, I2, . . . , In) disposed on the supply lines of the electronic modules (M1, M2, . . . , Mn).

3. Device according to claim 2, characterized in that, the electronic amplifying circuits (A1, A2, A3) interposed at input ahead of the conductors (210, 211, 212) of the network for partitioning load shedding commands (21) are equipped with a contact relay (35) interposed on their output making it possible to subject the execution of a load shedding command to an additional condition such as the noting of a low electric voltage on the electrical energy distribution network or networks (20) at the input of the rack (1).

4. Device according to claim 2, characterized in that the electronic amplifying circuits (A1, A2, A3) interposed at input, ahead of the conductors (210, 211, 212) of the network for partitioning load shedding commands (21) are equipped with a contact relay (36) connecting their output to earth or to the potential of a bias source in such a way as to force the generation of a load shedding command in the presence of an additional condition such as the noting of an overly large electric current consumed by the rack (1).

5. Device according to claim 2, characterized in that the electronic amplifying circuits (A1, A2, A3) interposed at input ahead of each of the conductors (210, 211, 212) of the network for partitioning load shedding commands (21) include at least one transistor-based amplifier stage.

6. Device according to claim 2, characterized in that the electronic amplifying circuits (A1, A2, A3) interposed at input, ahead of each of the conductors (210, 211, 212) of the network for partitioning load shedding commands (21) include two transistor-based amplifier stages (30, 31).

7. Device according to claim 2, characterized in that the electronic amplifying circuits (A1, A2, A3) interposed at input, ahead of each of the conductors (210, 211, 212) of the network for partitioning load shedding commands (21) include at least one transistor-based amplifier stage (30) mounted in common emitter mode.

8. Device according to claim 2, characterized in that the electronic amplifying circuits (A1, A2, A3) interposed at input, ahead of each of the conductors (210, 211, 212) of the network for partitioning load shedding commands (21) have their inputs referred back when quiescent by a resistive circuit (32) to a bias voltage urging them to a disabled or saturated state corresponding to an absence of load shedding command (D1, D2, D3).

9. Device according to claim 2, characterized in that the electronic amplifying circuits (A1, A2, A3) interposed at input, ahead of each of the conductors (210, 211, 212) of the network for partitioning load shedding commands (21) include at input a contact relay (33) open when quiescent, ordered to close by a load shedding command (D1, D2 or D3) imposing a bias voltage on their inputs causing them to leave their quiescent state.

10. Device according to claim 1, characterized in that it is made in the form of a so-called "supply" module (40) which plugs into the electronic rack (1) in the same way as the other electronic modules (M1, M2, . . . , Mn) and which exhibits on its front edge (45), accessible from outside the rack (1), a plug-in submodule (48) to which some or all of the straps (220) of the tag strip (22) are dropped.

11. Device according to claim 1, implemented with electronic modules (M1, M2, . . . , Mn) to be supplied provided with identifying means specifying their levels of criticality, characterized in that it includes an automaton analyzing the consistency between the load shedding levels assigned to the electronic modules (M1, M2, . . . , Mn) such as they result from the configuration adopted for the straps (220) of the tag strip (22) and the levels of criticality of the electronic modules such as they ensue from the information provided by their identifying means.

12. Device according to claim 11, characterized in that it includes a consistency indicator light (50) controlled by the consistency analysis automaton.

13. Device according to claim 10, characterized in that the consistency indicator light (50) is placed on the front edge of the supply module, visible from outside the rack.

14. Device according to claims 10 characterized in that the consistency indicator light (50) is mounted on the front edge of the plug-in submodule (48).

15. Device according to claim 12, characterized in that the consistency indicator light is placed on the front edge of the supply module, visible from outside the rack.

16. Device according to claim 12, characterized in that the consistency indicator light is mounted on the front edge of the plug-in submodule.

* * * * *